Oct. 25, 1966 K. E. MERCER 3,281,723

DYNAMIC EQUALIZER CIRCUITS HAVING A LIGHT DEPENDENT CELL FOR PRODUCING A RELATIVELY CONSTANT APPARENT LOUDNESS EFFECT

Filed Feb. 3, 1964 3 Sheets-Sheet 1

INVENTOR.
KENT ELLIOTT MERCER

BY Darby & Darby

ATTORNEYS

Oct. 25, 1966 K. E. MERCER 3,281,723

DYNAMIC EQUALIZER CIRCUITS HAVING A LIGHT DEPENDENT CELL FOR PRODUCING A RELATIVELY CONSTANT APPARENT LOUDNESS EFFECT

Filed Feb. 3, 1964 3 Sheets-Sheet 3

RESPONSE IN DB.

INVENTOR.
KENT ELLIOTT MERCER

BY Darby & Darby

ATTORNEYS

United States Patent Office 3,281,723

Patented Oct. 25, 1966

3,281,723

DYNAMIC EQUALIZER CIRCUITS HAVING A LIGHT DEPENDENT CELL FOR PRODUCING A RELATIVELY CONSTANT APPARENT LOUDNESS EFFECT

Kent Elliott Mercer, New Hyde Park, N.Y., assignor to Fairchild Recording Equipment Corporation, Long Island City, N.Y., a corporation of New York Filed Feb. 3, 1964, Ser. No. 342,094

11 Claims. (Cl. 333—18)

This invention relates to circuits for the dynamic equalization of variable level program signals and more particularly to dynamic equalizer circuits for producing a relatively constant apparent loudness effect by controllably redistributing both the high and low frequency portions of the signal in a program channel as the program signal level decreases.

Work done by Fletcher and Munson in the area of the effect of the frequency distribution of program signals on human auditory perception has indicated that as listening levels or program levels are decreased, the perception by humans of the high and low frequency portions of the program becomes increasingly difficult. This means that for loud program signal levels no difficulty is experienced in deriving the high and low frequency information but as the program signal level drops, auditory perception of the program becomes increasingly difficult due to both the drop in the signal level and the added falling off of auditory perception to the high and low frequency information. This effect is called a decrease in the "apparent loudness" of the reproduced program, i.e., an increase in the apparent loss of the high and low frequency portions of the program signals due to hearing losses.

In the reproduction of audio programs it would be desirable to maintain a relatively constant apparent loudness effect so that programs of different levels could be heard with equal facility. The present invention is directed to circuits for compensating for the falling off of high and low frequency auditory perception to low level program signals by providing a relatively constant apparent loudness effect. This is accomplished by correcting the frequency response of an electronic audio signal reproducing system to compensate for the human auditory response in a manner such that the high and low frequency portions of the program signal are emphasized as the overall program signal level is decreased. Stated in another way, the circuits of the present invention operate to produce loudness or signal response compensation curves which are similar to the auditory response curves derived by Fletcher and Munson. These loudness curves modify the input program signal accordingly, so that the aurally reproduced program signal has a relatively constant apparent loudness effect to the human listener.

In accordance with the invention, circuits are provided for producing the desired loudness compensation curves in a dynamic manner so that as the program level drops the loudness curve increases, i.e., the high and low frequency portions of program signal emphasized more as the program level drops, and as the program level increases the loudness curve decreases. By doing this, a relatively constant apparent loudness effect is produced for substantially all levels of program signal information within the predetermined operating ranges of the circuits. In the various embodiments of the invention described herein the program signals are passed through passive rather than active circuit components to produce the desired dynamic loudness compensation curves. Since these components are passive, no additional distortion or noise is introduced in the final loudness compensated output signals of the circuits.

The circuits of the preferred embodiment of the present invention also utilize light-dependent resistors as one of the components for producing the desired loudness curves. These light-dependent resistors operate in response to the light output provided by a control lamp whose output is in turn controlled by sensing the level of the input program signals. In a preferred circuit embodiment the program signals are passed through a bandpass filter which provides a constant attenuation for the mid-range frequencies of an audio program signal. The light dependent resistors are used to provide a variable attenuation for the high and low frequency portions of the signal so that these portions are attenuated less as the program signal level decreases and are attenuated more as the program signal level increases. This action produces the desired loudness curves in response to variable level program signal inputs.

In a preferred embodiment of the invention a continual range of output loudness curves is available through the use of a threshold control provided in the dynamic equalizer circuit. Additionally, the preferred embodiment of the invention also provides means by which the high frequency and low frequency ends of the loudness compensation curve can be controlled. This provides the user with wide latitude in changing loudness curve contours to accommodate program demands and individual listening tastes.

It is therefore an object of the present invention to provide a dynamic equalizer circuit for producing a relatively constant apparent loudness effect.

A further object of the invention is to provide dynamic equalizer circuits for boosting the high and low frequency portions of an audio program signal in response to decreasing signal levels of the program.

A further object of the invention is to provide dynamic equalizer circuits utilizing light-dependent resistors in a compensating network for producing desired loudness compensation curves in response to varying level program input signals.

A further object of the invention is to provide circuits for dynamically equalizing the high and low frequency portions of a program signal as the level of the signal changes in a manner such that as the program level drops the loudness compensation curve increases and as the program increases the loudness compensation curve decreases.

Other objects and advantages of the present invention will become more apparent upon reference to the following specification and annexed drawings in which.

Figure 1:
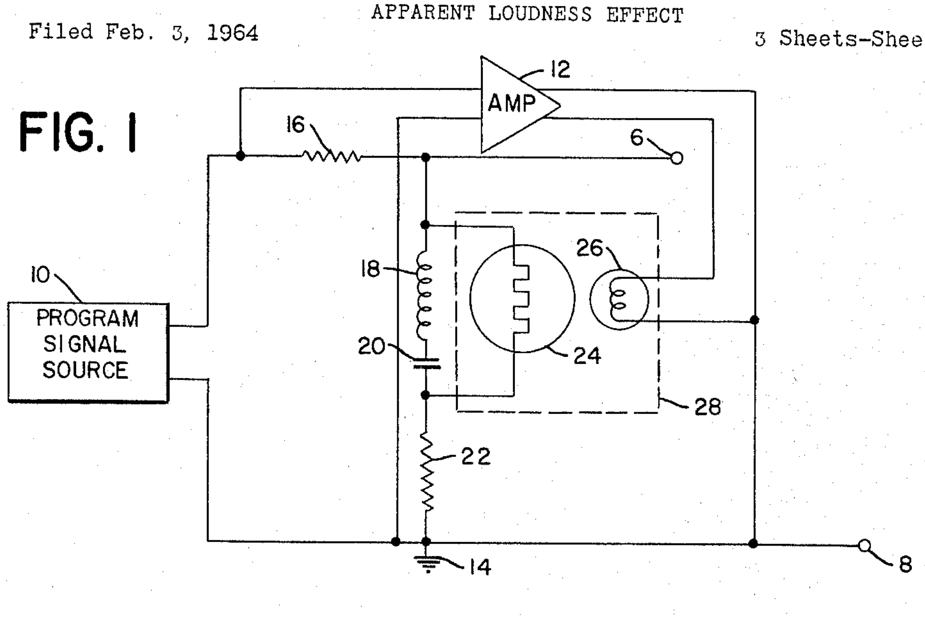
FIGURE 1 is a schematic diagram illustrating one circuit for the purpose of illustrating the principles of the present invention.

Referring to FIGURE 1, a source 10 is provided for producing program signals which preferably include components in the audio frequency range, for example in the range from 0 to 20,000 cycles per second. The signal source 10 may be any suitable source, for example, an AM or FM radio or tuner, the output from a monophonic phonograph cartridge or one channel of a stereo cartridge, an amplifier, preamplifier, film sound track, etc. The upper output line from the signal source 10 is illustratively connected to the input of an amplifier 12 while the lower output line is connected to a point of reference potential such as ground 14. The lower input line of amplifier 12 is also connected to the point of reference potential.

Connected between the upper input terminal of the amplifier 12 and the point of reference potential 14 is a voltage divider compensating network formed by a series connected resistor 16, a coil or inductor 18, a capacitor 20 and a resistor 22. This compensating network serves to shunt a portion of the amplifier's input signal from source 10 to the point of reference potential 14 in a manner which is both frequency selective and dependent upon the amplitude of the input signal to amplifier 12.

The compensating network is frequency selective due to the presence of the series connected coil 18 and capacitor 20. Components 18 and 20 are selected to form a series tuned resonant circuit which preferably has a relatively wide bandwidth, i.e., relatively low Q. The resonant frequency of circuit 18, 20 is selected at a point in the mid-audio frequency range, for example, around 1,000 cycles. Since this circuit has a relatively wide bandwidth, its effect will be felt on all frequencies in the neighborhood of from about 40 cycles up to about approximately 10,000 cycles when the resonant frequency is selected at 1,000 cycles. It should be understood that the resonant frequency for the circuit 18, 20 can be selected as desired and that any type of a frequency selective network or filter may be used.

Shunted across the tuned resonant circuit 18, 20 is a light-dependent resistor 24. The light-dependent resistor is any suitable device, such as a cadmium sulphide cell for example, whose resistance changes in response to the amount of illumination impinging thereon. The cadmium sulphide cell referred to above has the characteristic that as no light is impinging thereon it has a relatively high or practically infinite resistance, in the order of several hundred megohms, while as the light impinging thereon increases its resistance decreases in a predetermined manner in proportion to the light. The lowest resistance value of the device can be under one hundred ohms. Many suitable cadmium sulphide cells and other types of light-dependent devices are currently available and no further description thereof is believed necessary.

Operating in conjunction with the light-dependent cell 24 is a light source or lamp 26 which is powered from the output signal of amplifier 12. Lamp 26 is preferably of the incandescent type although a neon lamp could be utilized if it is desired to provide a rectifying effect, actually an averaging effect, on the compensating circuit. Both the light-dependent cell 24 and the lamp 26 are preferably enclosed in a suitable light-tight housing 28 which prevents changes in external illumination from affecting the resistance of the cell 24. It should be understood that as the amplitude of the output signal from amplifier 12 increases, in response to an increasing level of the program signals from source 10, the output illumination of lamp 26 also increases causing a resultant decrease in the resistance of cell 24.

The circuit of FIGURE 1 operates as follows. With no light output being produced by lamp 26, corresponding ner in proportion to the light. The lowest resistance value to a low level program signal input, the mid-range of frequencies of the program signals from source 10 are subjected to a fixed attenuation determined primarily by the ratio of the resistors 16 and 22. This occurs because the tuned resonant circuit 18 and 20 is effective to pass these mid-range frequencies to the resistor 22 and the point of reference potential 14. The cell 24 has no effect to shunt the tuned resonant circuit since its resistance at this time is extremely high. Thus, with light output from lamp 26 the compensating network 16, 18, 20 and 22 is ineffective to those signal components which are not passed by the tuned resonant circuit 18, 20. Under this condition the high and low frequency components of the signal are effectively boosted since the mid-range components are attenuated by the voltage dividing action.

As the signal level from the source 10 increases, with a resultant increase in the output of lamp 26, the resistance of the light-dependent cell 24 decreases. This causes shunting of all of the frequency components of the signal from source 10 through cell 24 to the point of reference potential 14. The result of this action is that the mid-audio frequencies are subjected to a substantially fixed attenuation, determined primarily by the ratio of resistors 16 and 22, while the high and low frequency components of the same audio signal are subjected to a variable attenuation determined by the input signal level, which operates to control the light output of lamp 26, as well as by the ratio of the resistors 16 and 22.

From the circuit of FIGURE 1 it can be seen that the signal appearing across the output terminals 6 and 8 will be varied in a manner corresponding to the Fletcher and Munson curves. This occurs because as the program signal level from source 10 increases, more and more of the high and low frequency components of the program are attenuated resulting in a decrease in the loudness curve. On the other hand, as the program signal level decreases, only the mid-range audio frequency signals are attenuated, meaning that the high and low frequency portions of the program are effectively boosted resulting in an increase in the loudness curve.

Figure 2:
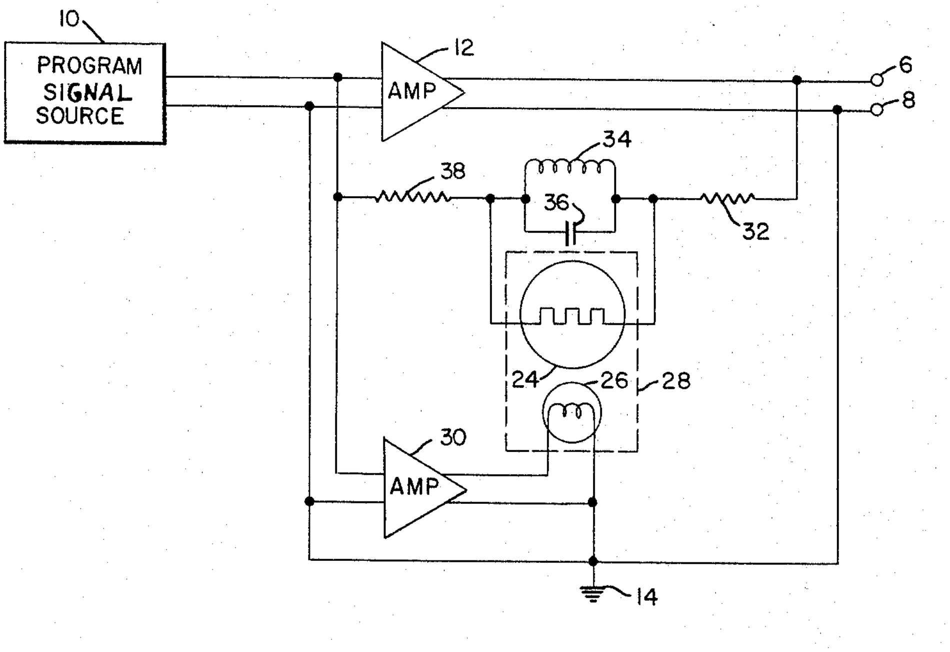
FIGURE 2 is a schematic diagram of another circuit illustrating the operating principles of the present invention.

FIGURE 2 shows another circuit for producing the desired loudness curves in which the high and low frequency components of a signal are effectively boosted in response to a decerasing program signal level. Similar reference numerals have been used as in the circuit of FIGURE 1, where applicable. In the circuit of FIGURE 2 the input of a control amplifier 30 is connected to the output of the source 10 to sense the amplitude level of the program signal. The output of amplifier 30 controls the illumination of the lamp 26 which is disposed in light-receiving relationship to the light-dependent resistor cell 24 in the light-tight housing 28. Amplifier 12 also receives the program signal from the source 10 for reproduction at its output terminals 6 and 8. Amplifier 12 has an odd number of stages so that a 180° phase shifted representation of its input signal is present at output at terminal 6. The 180° phase shifted signal is applied as a negative feedback signal at the input of the amplifier 12 through the series connected resistor 32, the parallel tuned resonant formed by coil 34 and capacitor 36, and the resistor 38. The circuit 34, 36 is made parallel resonant at some frequency in the mid-range and thus will pass the largest negative feedback signal back to the input of amplifier 12 at the resonant mid-range frequency. As before, the resonant frequency and Q of circuit 34, 36 is selected as desired. The parallel resonant circuit 34, 36 is shunted by the light dependent resistor cell 24 so that as its resistance is decreased, due to increased output of lamp 26, more of the higher and lower frequency components of the signal at terminals 6 and 8 are applied back to the input of amplifier 12 as a negative feedback signal.

The operation of the circuit of FIGURE 2 is similar to that of FIGURE 1. When the signal level from source 10 is low enough so that the lamp 26 is not illuminated by the action of control amplifier 30, then a maximum amplitude negative feedback signal at the mid-audio range is provided by the parallel tuned resonant circuit 34 and 36 through the resistors 32 and 38. This serves to attenuate the mid-range frequency components at output terminals 6 and 8 and thus to effectively boost the high and low frequency portions of the program signal. As the amplitude of the input signal from source 10 increases the output of lamp 26 also increases. This decreases the resistance of cell 24 and the low and high frequency portions of the program signal at the output of amplifier 12 are shunted through the cell 24 back to the input of amplifier 12. This in turn decreases the high and low frequency components of the audio signal present at the output of the amplifier 12. Thus, the circuit of FIGURE 2 produces a loudness curve whose high and low frequency portions increase in response to a decreasing level program signal and decrease in response to increasing program level signals.

It should be understood that both the compensating networks shown in FIGURES 1 and 2 are purely passive, i.e., formed by resistors, capacitors and inductors, so that no noise or distortion is introduced to the progarm signal in either of the circuits. It should also be clear that the circuits of FIGURES 1 and 2 are dynamic since the compensation curve varies continuously in response to the magnitude of the input signal.

Figure 3:
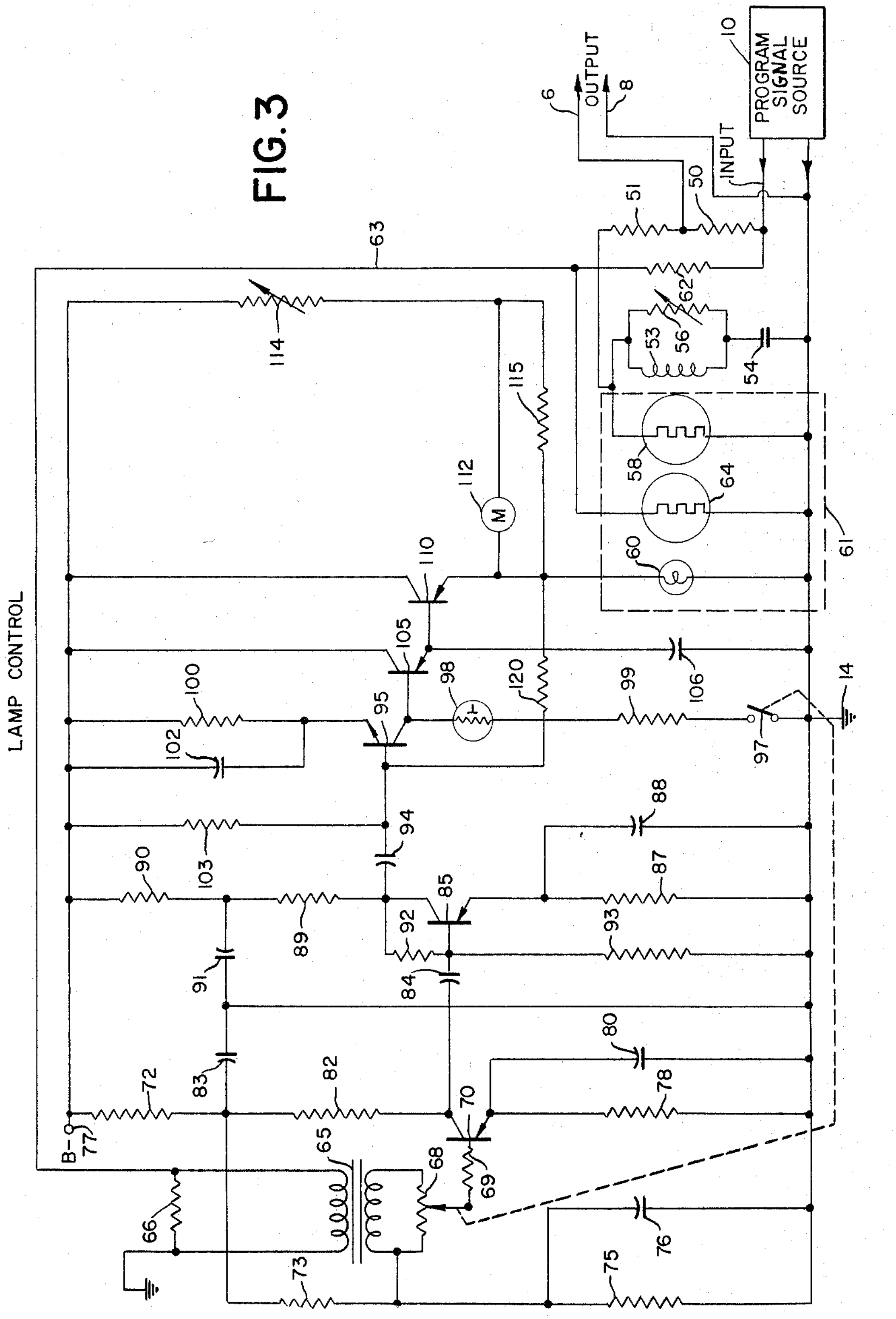
FIGURE 3 is a schematic diagram of the details of a circuit utilizing the principles of the present invention showing the amplifier circuit for sensing the level of the input signals and operating the control lamp.

FIGURE 3 shows details of a circuit utilizing the operating principles described in FIGURE 1. Here, the program signals are again supplied by the source 10 whose lower terminal is connected to the point of reference potential 14. A voltage divider network, similar to that of FIGURE 1 and formed by the series connected resistors 50 and 51, and the series tuned resonant circuit of coil 53 and the capacitor 54, is connected between the upper terminal of source 10 and ground. The coil 53 is shunted by a variable resistor 56 whose function is to control the bass boost of the compensation curve by varying the effectiveness of the coil 53 to high frequencies in accordance with the amount of resistance shunted thereacross. Resistor 56 will attenuate high frequencies and have little effect on the lows. If desired, a fixed value resistor (not shown) can be shunted across capacitor 54 to ground 14 to restrict the maximum amount of low frequency boost.

The frequency selective network 53 and 54 is shunted by a light dependent resistance device 58 which operates in the manner described with respect to FIGURE 1. The output of the circuit of FIGURE 3 is taken across terminals 6 and 8, the former being connected at the junction of resistors 50 and 51. As can be seen, a fixed ratio voltage divider of resistors 50 and 51 is provided for the mid-range audio frequency components at all times and the series resonant network 53, 54 presents a low impedance to ground 14 for these components.

The resistance of light dependent device 58 is controlled by the output illumination of an incandescent lamp 60 located within the same light-tight housing 61. The output of lamp 60 is controlled by the remaining elements of the circuit whose operation is described below.

The upper output terminal of source 10 is connected to one end of a resistor 62 in the signal control line 63 of the lamp control circuit. The other end of resistor 62 is returned to the ground 14 by another light dependent device 64 located in the light-tight housing 61. Resistor 62 and device 64 form a voltage divider network and the function of device 64 is to vary its resistance to vary the amplitude of the control signal for the control circuit for lamp 60 in accordance with the amplitude of the signal from source 10. It should be clear that as the intensity of lamp 60 increases, due to an increase in the amplitude of the program level signal from source 10, that the resistance of device 64 will decrease causing a resultant decrease in the amplitude of the lamp control signal on line 63. This permits operation of the circuit over a relatively extended range before the lamp 60 reaches a condition of saturation, i.e., would respond to no further increase in the amplitude of the signal from source 10. This latter result is unwanted since it would reduce the effectiveness of the circuit. Therefore, attenuation of the lamp control signal on line 63 is desirable.

The lamp control signal on line 63 is applied to the primary winding of a transformer 65 which is shunted by a resistor 66. The signal induced into the secondary of resistor 66 is applied through the slider of a potentiometer 68 connected thereacross and through a resistor 69 to the base of a conventional PNP common emitter transistor amplifier 70. The potentiometer 68 serves as a threshold control since it determines at what input signal level on line 63 transistor 70 will conduct. Base bias for transistor 70 is established through the voltage divider network formed by resistors 72, 73 and 68. Resistor 72 is connected to a suitable source of B minus potential 77 (not shown) which may be any suitable rectifier circuit or battery. The secondary of transformer 68 also has connected thereto a smoothing circuit formed by the resistor 75 and capacitor 76. The emitter circuit of transistor 70 has a conventional emitter bias circuit formed by resistor 78 and capacitor 80. Collector bias for transistor 70 is established by a resistor 82 connected to resistor 72. A capacitor 83 is connected between the junction of resistors 72 and 82 and ground 14 to filter the collector voltage.

The output signal from the collector of transistor 70 is applied through a capacitor 84 to the base electrode of another conventional PNP transistor amplifier 85 which has an emitter bias circuit formed by resistor 87 and capacitor 88. The collector of transistor 85 is connected to the B minus source 77 through the voltage divider formed by resistors 89 and 90. A capacitor 91 is used as a smoothing filter. An amount of degenerative feedback is provided for the base of transistor 85 from the collector through a resistor 92 which is connected between the collector and the base. This increases the input impedance of transistor 85. The base is returned to ground through a resistor 93.

The output of transistor 85 is taken from the collector electrode and applied through a capacitor 94 to the base of an NPN transistor 95. With the switch 97 in the collector circuit of transistor 95 closed, the transistor is normally held cut-off by the voltage produced in an emitter bias network formed by resistor 100 and capacitor 102 and the base bias voltage of resistor 103. The collector is connected to the point of reference potential through the switch 97 by a thermistor 98 and a resistor 99. The thermistor provides an amount of temperature compensation for the circuit.

The collector of transistor 95 is directly connected to the base electrode of a PNP transistor 105 whose collector is connected directly to the B minus supply 77 and whose emitter is returned to ground through the capacitor 106. When switch 97 is closed and with transistor 95 non-conductive, transistor 105 is biased to cut-off through the voltage divider comprising the leakage resistance of transistor 95, thermistor 98 and resistor 99. When transistor 95 conducts, transistor 105 will also conduct.

The emitter of transistor 105 is connected directly to the base electrode of a PNP transistor 110. The collector of this transistor is also returned directly to the B minus supply 77 and the emitter is returned to ground through the lamp 60. The current flowing in the emitter circuit of transistor 110 during conduction will illuminate the lamp. Transistor 110 conducts in response to the conduction of transistor 105.

The operation of the circuit of FIGURE 3 is as follows. A signal above the conduction threshold level of transistor 70, as set by the potentiometer 68, is amplified by transistors 70 and 85 and applied to the base of normally cut-off transistor 95. This amplified signal tends to drive transistor 95 towards conduction and in turn causes normally cut-off transistor 105 to conduct. This produces a signal at the emitter electrode of transistor 105, which signal is averaged or smoothed by the capacitor 106 and applied to the base of transistor 110 causing it to conduct. The conduction of transistor 110 in turn produces a current in its emitter circuit which makes lamp 60 light. The light output of lamp 60 is dependent upon the degree of conduction of transistor 110, which in turn is dependent upon the amplitude of the control signal on line 63 and the amplitude of the signal from source 10.

A metering circuit formed by a meter 112 is provided to give the circuit user a visual indication of the degree of compensation provided by the circuit. One terminal of the meter is connected to the emitter electrode of transistor 110 and the other is returned to the B minus supply 77 through a variable resistor 114 used to set the meter. A meter shunt resistor 115 is also provided.

The operation of the circuit of FIGURE 3 is similar to that of FIGURE 1. When the program signal level is below the conduction threshold of transistor 70, lamp 60 is extinguished and a fixed attenuation for the mid-range frequency components is provided by the resistors 50 and 51. This boosts the high and low frequency components of the signal at output terminals 6 and 8. Increase in the level of the program signal causes the lamp 60 to light proportionately causing a decrease in the resistance of cell 58. This produces shunting of the high and low frequency components to ground 14 and results in a decrease in the loudness compensation curve. The level of the control signal in line 63 is reduced in a similar manner in response to increasing level program signals by the decrease in resistance of cell 64 in response to increased light output from lamp 60.

A small amount of idling current is supplied to the lamp 60 through a resistor 120 connected to the base electrode of transistor 95. This current is very small and causes the lamp 60 to glow very slightly at all times. Thus, the lamp 60 will be immediately responsive to any control signal above the threshold level and there will be no thermal lag as would normally be caused by an incandescent lamp during the time it takes to heat the filament.

In order to disable the circuit the switch 97 need only be opened. This switch is preferably located on the threshold control resistor 68. This causes transistor 95 to become conductive and in turn drive transistors 105 and 110 to maximum conduction. This will cause the lamp 60 to produce maximum light output and therefore both light dependent resistance devices 58 and 64 will have minimum attenuation. The low resistance of light dependent device 58 shunting the frequency selective network 53, 54 will almost entirely eliminate the frequency selective effect so that the entire frequency range of the input signal will now be attenuated slightly, rather than just the mid-range. The voltage divider formed by resistors 50 and 51 will still produce an adequate amplitude output signal. At the same time, the low resistance of device 64 will shunt the lamp control signal to ground so that the control circuit will be rendered relatively ineffective.

Figure 4:
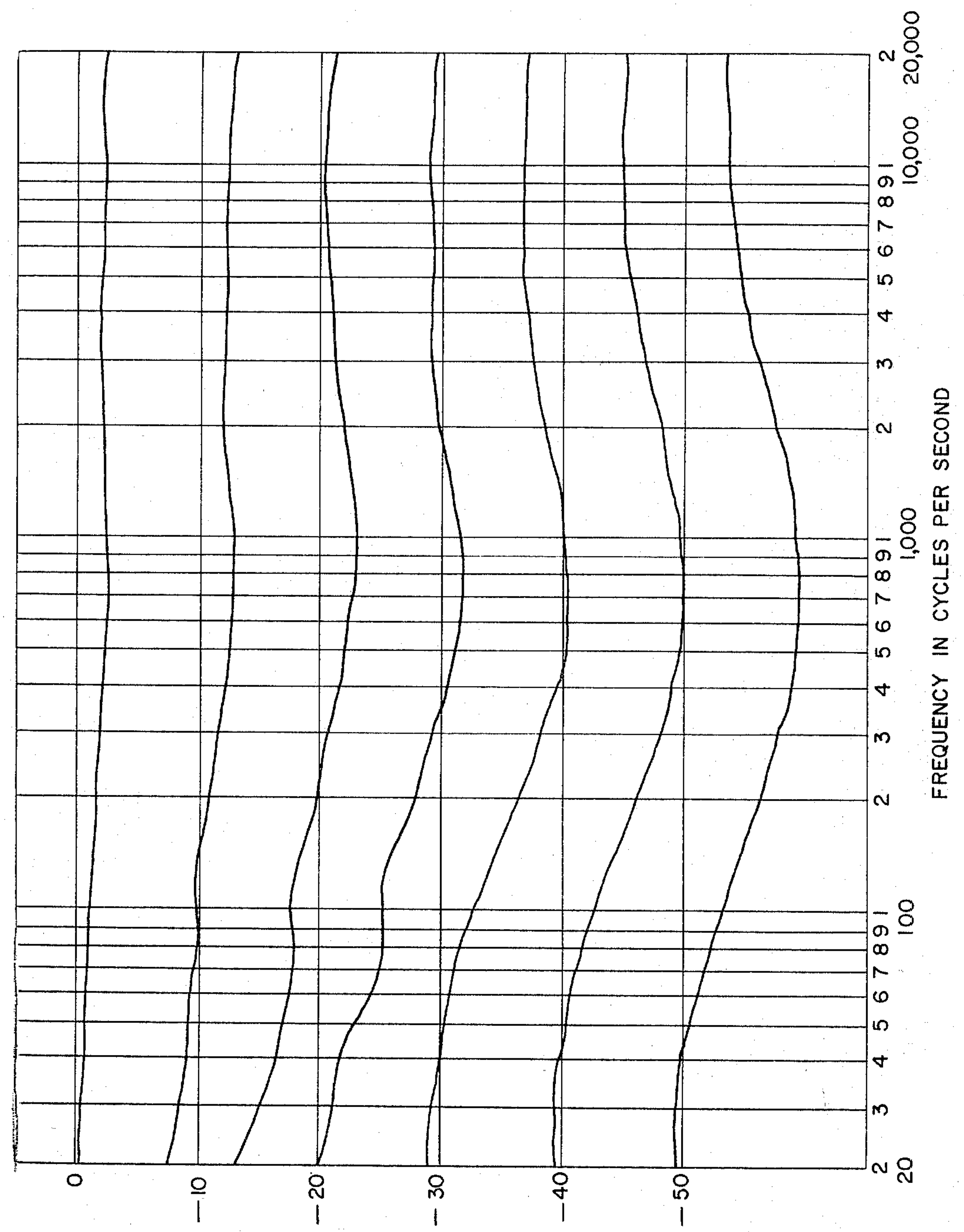
FIGURE 4 is a diagram illustrating loudness curves obtainable with the circuit of FIGURE 3.

FIGURE 4 is a graph showing the amplitude-frequency response of the circuit of FIGURE 3. It should be noted that as the program signal level decreases, the high and low frequency portions of the curves are emphasized. At 0 db, i.e., high program level, there is substantially no loudness compensation while at —50 db, the 1,000 cycle components are about 10 db down from the low frequency components (20 c.p.s.) and 5 db down from the high frequency components (20 kc.). It should be understood that the values shown for the loudness curves of FIGURE 4 are illustrative only and that the amount of compensation and contour of the curves can be varied by suitable selection of circuit components.

The circuits of the present invention have many uses. For example, in scoring movie films or films and tapes for television, when music is faded to permit narration, the quality of the music usually becomes thin due to the reduced music program level and decrease in the loudness curve. By using the present circuits a full-bodied sound can be maintained during these scoring portions by increasing the loudness effect. Also, in complex mixing for phonograph recording the use of the circuits of the present invention allows greater definition of low level orchestral passages as scored. Also, when an orchestra fades for a vocalist or vocal group, the circuits maintain a better quality sound for the music portion of the record.

The circuits also find use in situations using filmed or taped television commercials where the commercial appears to be louder than the normal program which it accompanies. This problem can be overcome to a considerable degree by using the circuits of the present invention on the program sources and not on the commercials.

The present invention can also be used effectively in background music applications to maintain proper balance of the reproduced sound over a wide range of reproduction levels used. Additionally, the circuits can be installed in all types of sound reproduction systems such as motion picture sound reproducing systems, stadium and auditorium speech reinforcement systems, etc., to provide a balanced listener response.

While preferred embodiments of the invention have been described above, it will be understood that these are illustrative only, and the invention is limited solely by the appended claims.

What is claimed is:

1. Apparatus for attenuating on a frequency selective basis program signals from a source generating variable amplitude level input audio frequency program signals having high, low and mid-range frequency components comprising: output means,
   frequency responsive means connected to said output means for attenuating said mid-range frequency components of said program signals relative to said high and low frequency components,
   a control lamp,
   means for connecting said control lamp to said source and responsive to the amplitude level of the program signals for controlling the light output of said lamp,
   light dependent resistor means disposed in light receiving relationship to said control lamp and responsive to the amount of light produced thereby for producing a variable resistance, and means connecting said light dependent resistor means in shunt with said frequency responsive means for reducing the attenuating effect of said attenuating means as the resistance of said light dependent resistor means decreases thereby controlling the attenuation of the mid-range frequency components of said program signals appearing at said output means relative to said high and low frequency components.

2. Apparatus as set forth in claim 1 and further comprising threshold means connected to said lamp light output control means for producing light output from said lamp in response to program level signals above a predetermined amplitude.

3. Apparatus as set forth in claim 1 and further comprising a second light dependent resistor means disposed in light receiving relationship to said control lamp and connected to said lamp light output control means for varying the light output of the lamp.

4. Apparatus as in claim 1 further comprising amplifier means for connection to said output means and to said source, and means connecting said attenuating means between the input and output of said amplifier means to provide a feedback signal for controlling the gain of said amplifier means.

5. Apparatus as in claim 1 wherein said attenuating means comprises a tuned resonant circuit including an inductor and a capacitor and said light dependent resistor is connected in shunt with said tuned resonant circuit.

6. Apparatus as in claim 5 further comprising amplifier means for connection to said output means and to said source, and means connecting said resonant circuit between the input and output of said amplifier means to provide a feedback signal for controlling the gain of said amplifier means.

7. Apparatus as in claim 5 wherein said inductor and capacitor are connected in parallel.

8. Apparatus as in claim 5 wherein said inductor and capacitor are connected in series.

9. Apparatus as in claim 8 wherein said tuned resonant circuit and shunting light dependent resistor are connected in series with said output means.

10. Apparatus for attenuating on a frequency selective basis program signals from a source generating variable amplitude level input audio frequency program signals having high, low and mid-range frequency components comprising:

amplifier means having an input for receiving said program signals from said source and an output, frequency responsive feedback means connected between the output and input of said amplifier means for applying a degenerative feedback signal back to the input of said amplifier in which the mid-range frequency components of the program signals are of increased amplitude relative to the high and low frequency components, a control lamp, light dependent resistor means disposed in light receiving relationship to said control lamp and connected to said frequency responsive feedback means so that said feedback means and said light dependent resistor means pass increasing amounts of the high and low frequency components of the program signals back to the input of said amplifier means in response to increased program signal levels, and means for connection to said source and connected to said control lamp and responsive to the amplitude level of the program signals for producing increasing lamp light output in response to increasing amplitude level program signals.

11. Apparatus as in claim 10 wherein said feedback means includes a tuned resonant circuit formed by a parallel connected capacitor and inductor and means connecting said light dependent resistor in shunt with said resonant circuit.

References Cited by the Examiner

UNITED STATES PATENTS

| | | | |
|---|---|---|---|
| 1,788,035 | 1/1931 | Stevenson | 179—1 |
| 1,938,256 | 12/1933 | Jacobs | 179—1 |
| 2,171,048 | 8/1939 | Rockwell | 179—1 |
| 2,177,050 | 10/1939 | Bartels | 179—1 |
| 2,680,232 | 6/1954 | Claras et al. | 333—28 |
| 2,900,609 | 8/1959 | Estkowski | 333—28 |

ELI LIEBERMAN, *Primary Examiner.*

G. L. GENSLER, *Assistant Examiner.*

UNITED STATES PATENT OFFICE
CERTIFICATE OF CORRECTION

Patent No. 3,281,723

October 25, 1966

Kent Elliott Mercer

It is hereby certified that error appears in the above numbered patent requiring correction and that the said Letters Patent should read as corrected below.

Column 3, line 60, strike out "ner in proportion to the light. The lowest resistance value"; column 4, line 29, for "decerasing" read -- decreasing --; column 5, line 7, for "progarm" read -- program --.

Signed and sealed this 5th day of September 1967.

(SEAL)
Attest:

ERNEST W. SWIDER
Attesting Officer

EDWARD J. BRENNER
Commissioner of Patents